US006613100B2

(12) United States Patent
Miller

(10) Patent No.: US 6,613,100 B2
(45) Date of Patent: *Sep. 2, 2003

(54) METHOD AND APPARATUS FOR DISPLAYING MINIATURIZED GRAPHICAL REPRESENTATIONS OF DOCUMENTS FOR ALTERNATIVE VIEWING SELECTION

(75) Inventor: John David Miller, Beaverton, OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,504

(22) Filed: Nov. 26, 1997

(65) Prior Publication Data

US 2002/0010718 A1 Jan. 24, 2002

(51) Int. Cl.[7] ................................................. G06F 7/00
(52) U.S. Cl. ...................... 715/526; 715/513; 345/763; 345/810; 345/835; 345/840
(58) Field of Search ............................... 345/335, 763, 345/810, 835, 838, 840, 348; 707/526, 501, 513

(56) References Cited

U.S. PATENT DOCUMENTS

| | | | | |
|---|---|---|---|---|
| 5,341,293 A | * | 8/1994 | Vertelney et al. | 707/530 |
| 5,367,626 A | * | 11/1994 | Morioka et al. | 345/348 |
| 5,408,659 A | * | 4/1995 | Cavendish et al. | 395/701 |
| 5,481,666 A | * | 1/1996 | Nguyen et al. | 345/357 |
| 5,621,874 A | * | 4/1997 | Lucas et al. | 707/500 |
| 5,644,737 A | * | 7/1997 | Tuniman et al. | 345/810 |
| 5,678,034 A | * | 10/1997 | Chew | 345/511 |
| 5,684,970 A | * | 11/1997 | Asuma et al. | 345/348 |
| 5,713,019 A | * | 1/1998 | Keaten | 707/10 |
| 5,754,179 A | * | 5/1998 | Hocker et al. | 345/348 |
| 5,799,304 A | | 8/1998 | Miller | |
| 5,801,699 A | * | 9/1998 | Hocker et al. | 345/348 |
| 5,831,631 A | | 11/1998 | Light et al. | |
| 5,832,474 A | * | 11/1998 | Lopresti et al. | 707/2 |
| 5,838,317 A | * | 11/1998 | Bolnick et al. | 345/339 |
| 5,854,630 A | * | 12/1998 | Nielsen | 345/352 |
| 5,859,636 A | * | 1/1999 | Pandit | 345/335 |

(List continued on next page.)

OTHER PUBLICATIONS

WordPerfect 6.1 screendumps, Fig. 1–2, p. 1, Apr. 15, 1996.*
Sam's Teach Yourself Windows 95 in 24 hours, 2nd ed. Sams, pp. 0–23, Mar. 19, 1997.*
Microsoft Office Shortcut Bar 97 screendumps, 1996, Figs. 1–2.*
Lierberman, Letizia: An Agent That Assists Web Browsing, Proceedings of the International Joint Conference on Artificial Intelligence, 8/95, pp. 1–11.*

*Primary Examiner*—Stephen S. Hong
*Assistant Examiner*—Cesar B Paula
(74) *Attorney, Agent, or Firm*—Blakely, Sokoloff, Taylor & Zafman LLP

(57) ABSTRACT

An apparatus for displaying miniaturized graphical representations (i.e., thumbnails) of documents for alternative viewing selection by a user. A current document is displayed on a display panel of a graphical user interface (GUI) for viewing and/or manipulation by a user. The GUI further includes a plurality of selection panels that collectively form a border around the current document of the display panel. Disposed on these selection panels are a plurality of thumbnails of other documents that are deemed relevant to the current document by a predetermined, user-defined criterion. Selection of one of these thumbnails conveniently displays the document represented by such thumbnail to be displayed on the display panel in lieu of the current document. Advantageously, documents deemed relevant to a currently displayed document are easily accessible to the user.

48 Claims, 6 Drawing Sheets

U.S. PATENT DOCUMENTS

| | | | |
|---|---|---|---|
| 5,873,107 A | * 2/1999 | Borovoy et al. | 707/501 |
| 5,880,730 A | * 3/1999 | Durand | 345/348 |
| 5,899,995 A | 5/1999 | Millier et al. | |
| 5,903,904 A | * 5/1999 | Peairs | 707/526 |
| 5,914,714 A | * 6/1999 | Brown | 345/866 |
| 5,917,488 A | * 6/1999 | Anderson et al. | 345/342 |
| 5,920,316 A | * 7/1999 | Oran et al. | 345/348 |
| 5,933,823 A | * 8/1999 | Cullen et al. | 707/530 |
| 5,943,679 A | * 8/1999 | Niles et al. | 707/526 |
| 5,963,964 A | * 10/1999 | Nielsen | 707/501 |
| 5,999,664 A | * 12/1999 | Mahoney et al. | 382/305 |
| 6,009,442 A | * 12/1999 | Chen et al. | 707/522 |
| 6,016,184 A | * 1/2000 | Haneda | 355/36 |
| 6,035,323 A | * 3/2000 | Narayen et al. | 709/201 |
| 6,044,365 A | * 3/2000 | Cannon et al. | 707/2 |
| 6,073,145 A | * 6/2000 | Funabashi | 707/526 |
| 6,088,032 A | * 7/2000 | Mackinlay | 345/355 |
| 6,161,102 A | * 12/2000 | Yanagihara et al. | 707/10 |
| 6,243,724 B1 | * 6/2001 | Mander et al. | 707/526 |
| 6,356,922 B1 | * 3/2002 | Schilit et al. | 707/3 |

* cited by examiner

METHOD AND APPARATUS FOR DISPLAYING MINIATURIZED GRAPHICAL REPRESENTATIONS OF DOCUMENTS FOR ALTERNATIVE VIEWING SELECTION

BACKGROUND OF THE INVENTION

1. Field of the Invention

The present invention relates generally to computer system applications and, more particularly, to a method and apparatus for displaying miniaturized graphical representations (i.e., thumbnails) of documents for alternative viewing selection by a user.

2. Description of the Related Art

The Internet, a vast network of computer systems worldwide, has undergone astronomical growth over the past several years. A significant contribution to this growth has been the introduction and widespread use of web browsers, which, from a software point of view, interface a computer user to the Internet. The web browser permits the user to select, view, and interact with a myriad of informational documents (i.e., web pages) from various network servers coupled to the Internet. The web browser effectively places this selection of vast information at the user's fingertips in a matter of seconds. As a result, the web browser has become one of the most popular computer applications in use today.

Referring to FIG. 1, a typical prior art web browser 100, such as Microsoft Internet Explorer 3.02, is shown displayed on a computer screen 110. Generally, when the user desires to access a specific web site of the Internet, he or she enters a Uniform Resource Locator (URL) in an entry field 120 of the web browser 100. The URL is an address that uniquely identifies a specific web site and will cause the web browser 100 to download the main web page (commonly referred to as a "home" page) of that web site. The web browser 100 will then subsequently display the downloaded home page in its display section 130 for viewing by the user. The home page provides the user with various sorts of information, and, typically, also provides options to select "links" to other web pages of the currently accessed web site and/or links to alternative web sites.

As a user "surfs" the Internet by accessing various web pages through the selection of these links, the web browser 100 records a list (or "stack") of URLs corresponding to the web pages accessed by the user. The user may desire to re-visit a previously viewed web page for a variety of reasons (e.g., to access more information from the page, have access to alternate links, etc.). For this reason, the web browser 100 includes a "back" button 140 and a "forward" button 150 to enable the user to re-visit a previously accessed web page by sequentially accessing such web pages via the buffered stack of URLs. These "back" and "forward" buttons 140, 150 provide some convenience to the user by preventing the need to re-enter the URL of the previously visited web page in the entry field 120. However, while these buttons 140, 150 may provide some ease in accessing previously visited web pages, their use also poses several disadvantages to the user. The buffered stack of URLs is effectively transparent to the user when using these buttons 140, 150. Accordingly, the user cannot visualize the buffered stack and, thus, must rely on his or her memory for a rough estimate of where the previously accessed web page's URL appears in the stack. Generally, the user will tediously actuate the "back" button 140 until the desired web page reappears in the display section 130. However, this action tends to be inefficient since it can take considerable time to reload (within the display section 130) each sequentially accessed web page while using the "back" button 140. Additionally, if the user desires to access a web page that appears at the beginning of a lengthy buffered stack, he or she wastes considerable time "stepping" through web pages that are intermediate in the URL stack before being able to access the desired web page. In some cases, it may have been quicker to manually enter the URL of the desired web page into the entry field 120, thus causing the arduous effort and time expended of "blindly" stepping through the stack of URLs to be completely useless.

An additional feature of the web browser 100, which may alleviate some of the disadvantages associated with the "back" and "forward" buttons 140, 150, is a "Go" feature 160. This feature allows the user to view and select from the buffered stack of URLs to re-visit a previously accessed web page. However, the "Go" feature 160 also suffers from its own disadvantages. That is, it does not constantly permit the display of the buffered stack contemporaneously with the display of the currently accessed web page, and, thus inconveniently requires the user to "pull down" a menu to view the buffered stack. Additionally, the "Go" feature 160 only displays a subset of about 5 URLs from the entire buffered stack of URLs (which could easily be 20–30 URLs, for example). Accordingly, the user is not provided with a full view of the URL stack and must tediously step through intermediate URLs of the displayed stack to view the entire stack. Therefore, this feature, while being somewhat convenient for accessing one of the 5 displayed URLs of the stack, still does not provide any visualization for the other URLs in the stack. Accordingly, the "Go" feature 160 does not provide the user any additional advantage over the "back" and "forward" buttons 140, 150 for those URLs that are not displayed.

Some "new generation" web browsers (currently being released) now provide "back list" and "forward list" options that display a list of the URLs either back or forward, respectively, in the URL stack for selection by the user. However, these options also inconveniently require the user to "pull down" a menu to view the list of URLs. Accordingly, these options, like that of the "Go" feature 160, do not permit the constant display of the URL stack contemporaneously with the currently accessed web page. Furthermore, these lists of URLs do not provide any actual visualization of the web pages that they represent. This becomes particularly difficult when the user desires to access several web pages of a particular web site, where only subtle distinctions between such web pages are seen in the URL. Accordingly, the user may waste a significant amount of time accessing undesired web pages by improper URL selection via these lists of URLs.

The present invention is directed to overcoming, or at least reducing the effects of, one or more of the problems set forth above.

SUMMARY OF THE INVENTION

In one aspect of the present invention, a method is provided for displaying miniaturized graphical representations of documents for alternative viewing selection by a user. The method includes displaying a current document of a computer application and determining if at least one other document is relevant to the current document based upon a predetermined criterion. The method further includes displaying a miniaturized graphical representation, uniquely identifying the at least one other document, contemporaneously with the current document in response to determining that the at least one other document is relevant to the current document.

In another aspect of the present invention, an apparatus includes a display screen adapted to display a current document of a computer application and a processor adapted to determine if at least one other document is relevant to the current document based upon a predetermined criterion. The processor is further adapted to display a miniaturized graphical representation, uniquely identifying the at least one other document, contemporaneously with the current document providing that the at least one other document was deemed relevant to the current document.

BRIEF DESCRIPTION OF THE DRAWINGS

Other objects and advantages of the invention will become apparent upon reading the following detailed description and upon reference to the drawings in which.

Figure 1:
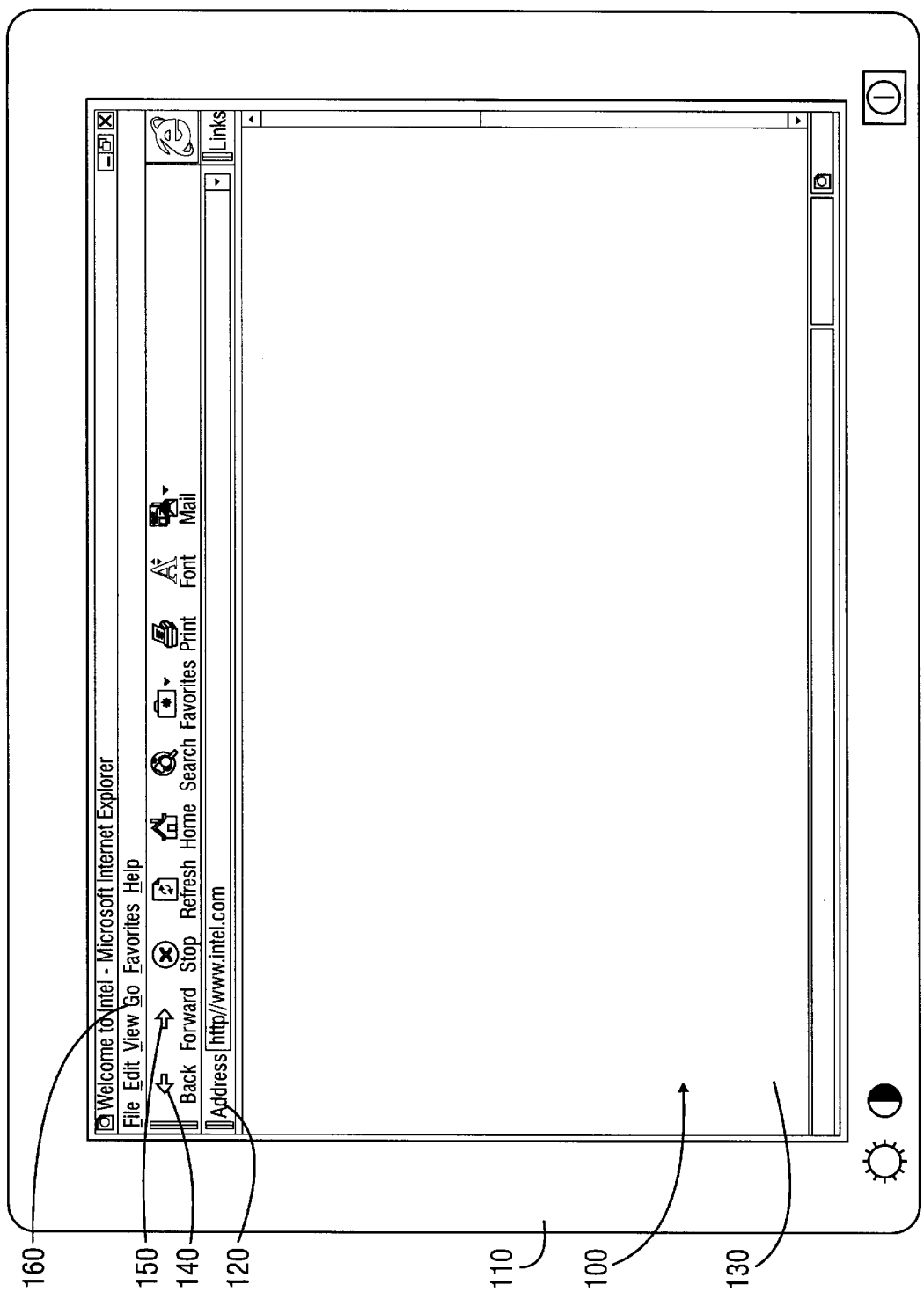
FIG. 1 illustrates a typical prior art web browser for accessing web pages from the Internet.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nonetheless be a routine undertaking for those of ordinary skill in the art having the benefit of this disclosure.

Figure 2A:
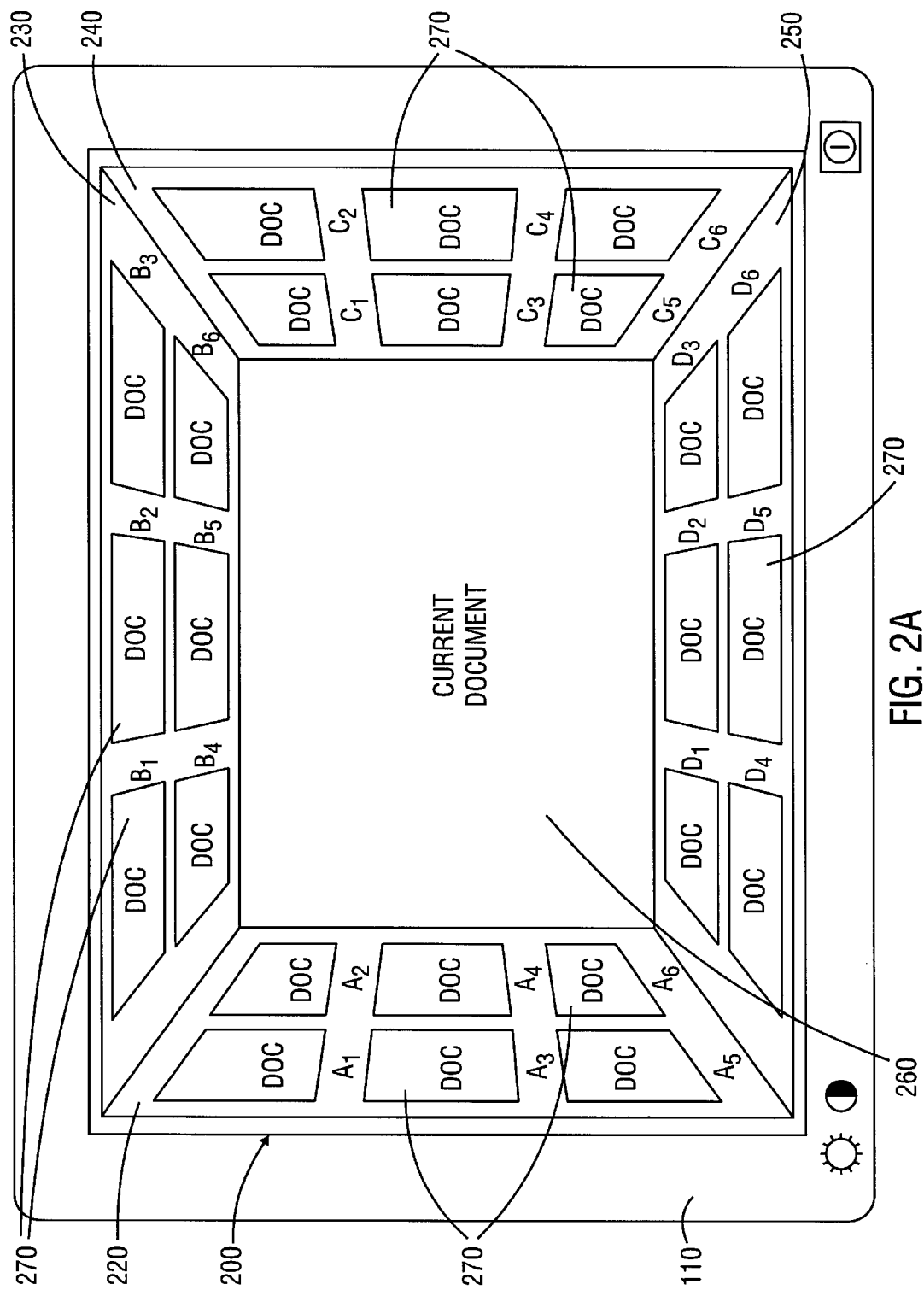
FIG. 2A shows a three-dimensional graphical user interface for displaying miniaturized graphical representations of documents for alternative viewing selection in accordance with one embodiment of the present invention.

Turning now to the drawings, and specifically referring to FIG. 2A, a graphical user interface (GUI) 200 is shown displayed on a computer screen 110. In accordance with one embodiment, the GUI 200 appears in the shape of a three-dimensional cuboid, and is oriented on the computer screen 110 such that its interior is viewed from an open end (i.e., a missing surface) of the cuboid. That is, it is as if the computer user is peering inside the cuboid via its one missing surface.

The GUI 200 comprises a plurality of selection panels 220–250 that collectively form a border around a display panel 260 when viewed by the user. The display panel 260 displays a particular document of a computer application that is currently being viewed and/or manipulated by the user. The document displayed on the display panel 260 could be from various types of computer applications. For example, the document could be a web page from a web browser, a document from a word processor or spreadsheet application, or an e-mail message from an e-mail application. It will be appreciated that several other document types (from various other computer applications) could also be displayed, and, thus, the present invention need not be limited to the aforementioned examples.

Each of the selection panels 220–250 surrounding the display panel 260 have disposed thereon a plurality of thumbnails 270 for selection by the user. These thumbnails 270 are miniaturized graphical representations of documents that may be relevant to the current document displayed on the display panel 260. Essentially, the thumbnail 270 is a minuscule picture of an actual document, which serves to uniquely identify the document by mere visual inspection of the thumbnail 270. It is important to note that the thumbnail 270 should not be confused with a conventional "icon", which is a minute graphical symbol that is typically used as a "shortcut" to a particular computer application. Such icons are mere generic representations of a particular computer application and do not serve to uniquely distinguish between specific documents of a computer application in a visually perceptible manner.

The thumbnails 270 provide the user quick access to documents as alternatives to the current document displayed on the display panel 260. Accordingly, when the user desires to access one of these documents, the user selects the appropriate thumbnail 270 via a user-input device (not shown), such as a computer mouse, trackball, etc. Such selection subsequently causes the desired document to be displayed on the display panel 260 for viewing and/or manipulation by the user.

Figure 2B:
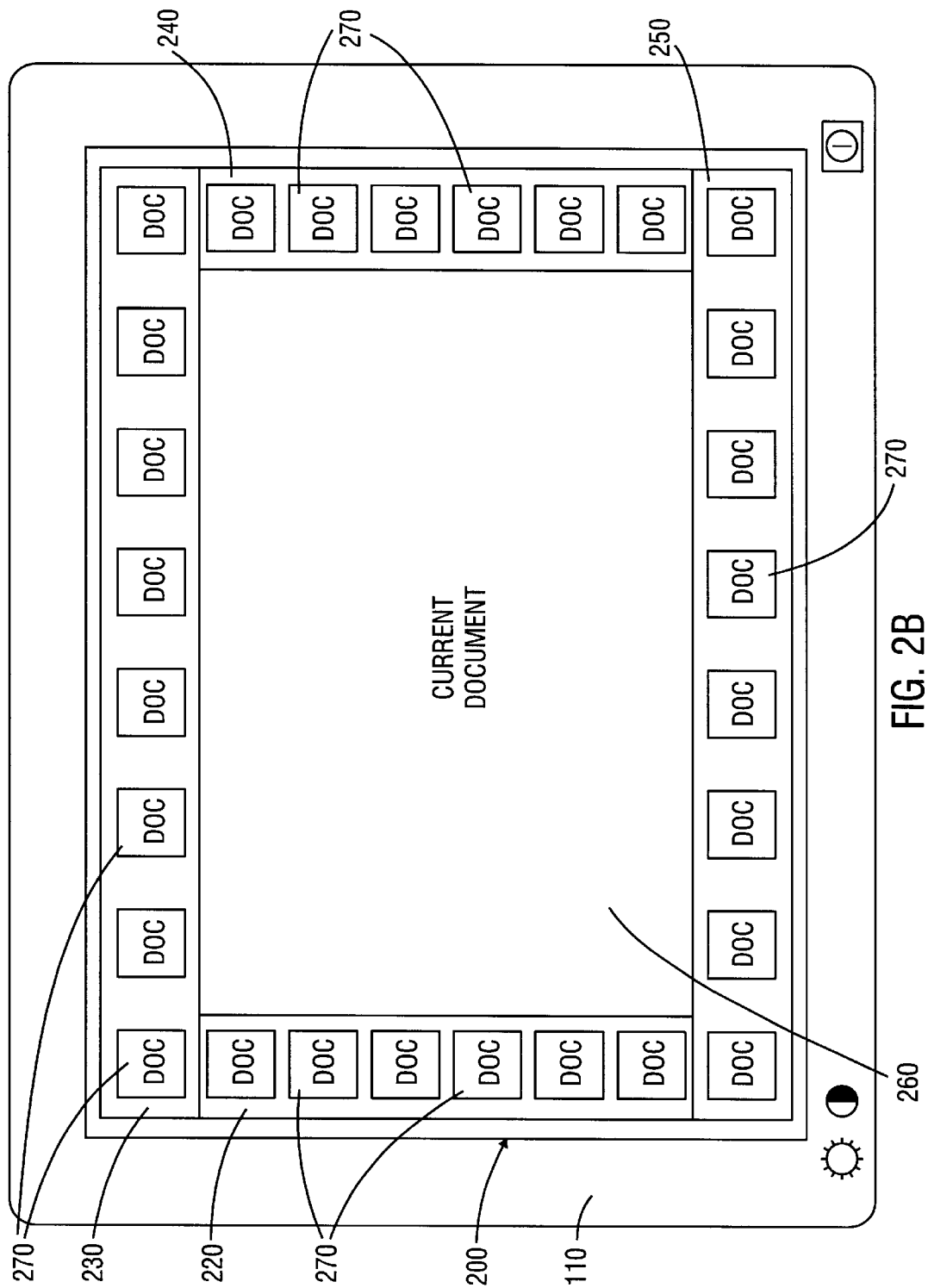
FIG. 2B shows a two-dimensional graphical user interface in accordance with another embodiment of the present invention.

As opposed to presenting the GUI 200 to the user in a three-dimensional manner as illustrated in FIG. 2A, in an alternative embodiment, the GUI 200 could be displayed two-dimensionally as shown in FIG. 2B. Each of these two configurations provides its own unique advantages to the user. For instance, the three-dimensional cuboid configuration of FIG. 2A "draws" the user's attention to the current document on the display panel 260, thereby reducing the likelihood of the user becoming distracted by the thumbnails 270 on the selection panels 220–250. The two-dimensional configuration of FIG. 2B, on the other hand, provides a larger display of the current document on the display panel 260. Thus, in this two-dimensional configuration, the user can advantageously view more information from the current document at one time. Furthermore, as opposed to providing the user with only a single type of configuration (i.e., with a two or three-dimensional configuration only), the present invention could be configured such that the user could select between the two or three-dimensional configurations according to his or her preference.

The GUI 200 can be used in conjunction with a plurality of different computer applications. That is, it can interact with one computer application, such as a word processor, and display thumbnails 270 corresponding to word processing documents for use with the word processor. Or, alternatively, the GUI 200 could display thumbnails 270 corresponding to spreadsheet documents when used in conjunction with a spreadsheet application, for example. In an alternative embodiment, the GUI 200 could be configured to simultaneously display thumbnails 270 of related documents corresponding to two or more different computer applications while the user is engaged in viewing and/or manipulating a document of one of the computer applications. For example, the GUI 200 could simultaneously display thumbnails 270 corresponding to word processing and spreadsheet documents, which are related to the currently viewed document on the display panel 260. In this particular example, the user, while working in the word processing environment (for instance), can retrieve a related spreadsheet document from the appropriate thumbnail 270. The selection of the spreadsheet document could be, for example, to incorporate related data from the spreadsheet into the word processing document.

To determine these related documents, the present invention could be configured with an automatic content analysis procedure, which analyzes documents to determine if they are related based upon predetermined criteria. Such relatedness is determined regardless of whether or not these documents belong to the same computer application. For example, a spreadsheet document could be determined to be associated with a word processing document, as previously discussed. The methodologies used in the automatic content analysis procedure to determine the relatedness between these documents is fully disclosed in U.S. patent application Ser. No. 08/367,991, entitled "Information Evaluation", by John D. Miller, filed on Jan. 3, 1995 and U.S. patent application Ser. No. 08/884,755, entitled "Method and Apparatus for Automatically Organizing Information", also by John D. Miller, filed on Jun. 30, 1997, both applications of which are incorporated herein by reference in their entirety.

Referring back to FIG. 2A, the grouping of thumbnails 270 on each respective selection panel 220–250 (i.e., $A_1$–$A_6$, $B_1$–$B_6$, etc.) could each respectively represent documents having a different relationship to the current document displayed on the display panel 260. That is, the grouping of thumbnails 270 appearing on the selection panel 220 (i.e., $A_1$–$A_6$) could all collectively have a similar relationship to the current document displayed on the display panel 260. And, the grouping of thumbnails 270 on the selection panel 240 (i.e., $C_1$–$C_6$) could all have a similar relationship to the current document, however, different than that of the relationship between the thumbnails 270 appearing on the selection panel 220 (i.e., $A_1$–$A_6$). For example, if the GUI 200 were used in conjunction with an e-mail application, the thumbnails 270 appearing on the selection panel 220 (i.e., $A_1$–$A_6$) could all represent "received" e-mail messages; whereas, those thumbnails 270 appearing on the selection panel 240 (i.e., $C_1$–$C_6$) could all represent e-mail messages that had been "sent". The selection panels 230 and 250 could be assigned other categories relevant to the e-mail application as well. Additionally, labels could be displayed on each of the selection panels 220–250 such that the user is able to distinguish between one grouping or category of thumbnails 270 from another. For instance, in the example above, the selection panel 220 could have a label such as "In-Box" or "Received" and the selection panel 240 could be labeled "Sent". The thumbnails 270 on each of the selection panels 220–250 can be grouped or categorized according to the user's preference. The manner in which the user defines a specific category to a selection panel 220–250 will be fully appreciated when described in connection with the apparatus for implementing the GUI 200, appearing below.

Figure 3:
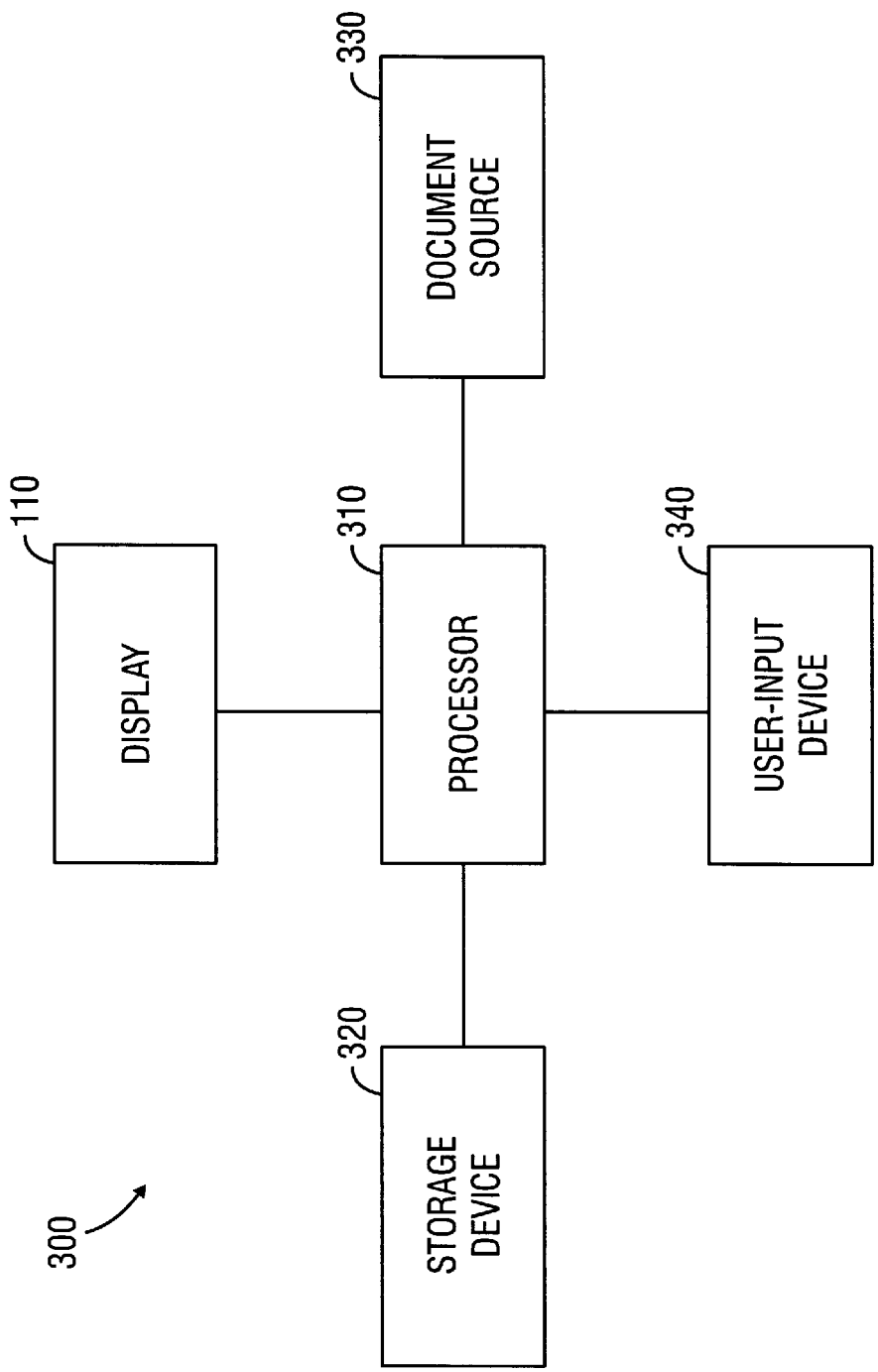
FIG. 3 depicts a block diagram of an apparatus for implementing the graphical user interface of FIGS. 2A and 2B.

Turning now to FIG. 3, an apparatus 300 for displaying the GUI 200 and implementing its functions is shown. The apparatus 300 comprises a processor 310 for processing a set of instructions from a storage device 320, which has a computer program stored therein. Based upon the instructions stored in the storage device 320, the processor displays the GUI 200 on the display screen 110 for visual presentation of the thumbnails 270 to the user. The processor 310 also runs various other computer applications (e.g., a word processor, web browser, e-mail, etc.). These computer applications could be stored in the storage device 320 or, alternatively, the applications may come from some other source (either internal or external to the apparatus 300).

The GUI 200 is also a computer application that is used in conjunction with these various other computer applications (e.g., wordprocessor, e-mail, etc.). When launched, the GUI 200 will essentially provide a "frame" around one of the desired computer applications such that the application itself appears on the display surface 260 of the GUI 200. For example, in the case where the application is a word processor, the word processor itself will appear on the display surface 260 of the GUI 200, and the selection panels 220–250 of the GUI 200 will effectively encapsulate or surround the word processor application.

The processor 310 further has the capability to retrieve a particular document of the selected computer application that is displayed on the display panel 260. These documents are retrieved from a document source 330, which could be embodied as a combination of various devices. For example, the document source 330 could be a disk drive for retrieving the documents from a disk, a hard disk (such as the storage device 320), a communications medium (e.g., modem, ISDN connection, etc.) for obtaining documents from other computer sources (e.g., the Internet), etc. Essentially, the document source 330 could be embodied as any known device that would permit the processor 310 to retrieve a document, whether that document resides internal or external to the apparatus 300.

The apparatus 300 further includes a user-input device 340, which permits the user to select the thumbnails 270 from the GUI 200. In the illustrated embodiment, the user-input device 340 is a computer mouse; however, it will be appreciated that the user-input device 340 can be of various other types, such as a trackball, touchpad, keyboard, touchscreen, etc. without departing from the spirit or scope of the invention. When the user desires to access a particular document, the user selects the appropriate thumbnail 270 via the user-input device 340. Such selection via the user-input device 340 subsequently causes the desired document to be displayed on the computer application appearing in the display panel 260 of the GUI 200.

The user-input device 340 can also be used to select various user preferences for personally configuring the GUI 200. That is, the user could select whether the GUI 200 appears in a two or three-dimensional configuration (as previously discussed), select the maximum number of thumbnails 270 that should appear on a particular selection panel 220–250, the physical dimensions of the selection panels 220–250, whether the thumbnails 270 should appear on the selection panels 220–250 in a single or double row/column, whether or not the selection panels 220–250 should display labels, etc. Furthermore, since there are limitations as to the number of thumbnails 270 that can be accommodated on a given selection panel 220–250, the GUI 200 could be configured to display a "more" button on the selection panel 220–250 to view additional thumbnails 270 for that particular panel 220–250. Additionally, due to the relative small size of the thumbnails 270, the GUI 200 could be further configured to magnify the thumbnails 270 by a predetermined magnification factor (e.g., 150%, 200%, etc.). Such magnification of the thumbnails 270 could result, for example, by merely placing the mouse pointer over the thumbnail 270. Once the mouse pointer is taken off, the thumbnail 270 would again return to its original size. The manner in which the user could define such preferences could be through a "pull down" menu, for example.

In addition to the aforementioned preferences, the user can allocate a particular category or relationship to a selection panel 220–250 by use of a "pull down" menu (as discussed above) or, alternatively, clicking a right mouse button while the mouse pointer is present on the desired selection panel 220–250. Subsequent to this latter action by the user, a menu would appear offering a variety of different categories that are appropriate to the particular computer application displayed on the display panel 260. For example, when an e-mail application appears on the display surface 260, the categories offered to the user may be "received mail", "outgoing mail", "sent mail", "drafts", etc. The user then "highlights" the desired choice and the thumbnails 270 corresponding to the chosen category would be displayed (by the processor 310) on that selection panel 220–250 of the GUI 200.

Figure 4:
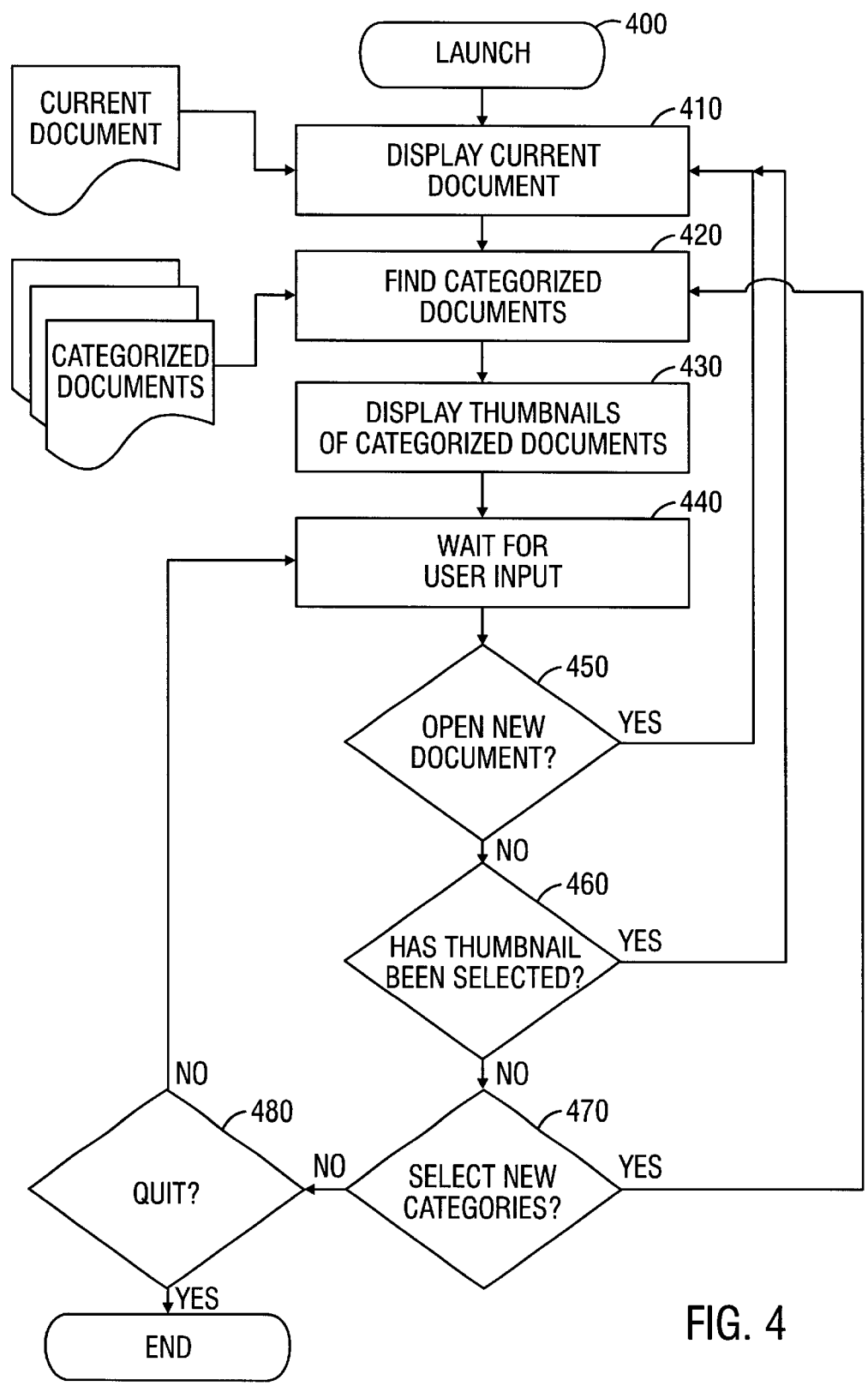
FIG. 4 shows a flowchart for the process used by the apparatus of FIG. 3 for implementing the graphical user interface of FIGS. 2A and 2B.

Turning now to FIG. 4, a flowchart is shown depicting a process used by the apparatus 300. Commencing at step 400, the user launches a particular computer application and retrieves a desired document. The processor 310 retrieves the desired document from the document source 330 and displays, at step 410, the document on the display panel 260 of the GUI 200. At step 420, the processor 310 further searches the document source 330 for documents that correspond to (or are relevant to) a particular category that is assigned to one of the selection panels 220–250 of the GUI 200. The manner in which the processor 310 finds these "categorized" documents could be by use of the automatic content analysis procedure (as previously mentioned). Upon determining which documents correspond to the selected category, the thumbnails 270 corresponding to such documents are displayed on their respective selection panels 220–250 of the GUI 200 at step 430. Next, at step 440, the processor 310 awaits a user input via the user-input device 340. If it is determined at step 450 that the user desires to open a new document by some conventional method (e.g., by going to the "File" menu of the application and selecting "Open", etc.), then the process reverts back to step 410 and the newly opened document is displayed as the current document. If, instead, the user has selected at step 460 one of the displayed thumbnails 270 via the user-input device 340, then the process also reverts back to step 410 where the document corresponding to the selected thumbnail 270 is retrieved by the processor 310 and displayed on the display panel 260 of the GUI 200 (i.e., the selected document now becomes the "current" document). If the user has not selected a thumbnail 270, the process continues to step 470, where it is determined whether the user desires to change any of the categories allocated to the selection panels 220–250. As previously mentioned, this could be accomplished by "right-clicking" the mouse (user-input device 340) on the desired selection panel 220–250 and selecting a desired category from a menu. If new categories are desired by the user, the process reverts back to step 420 wherein the processor 310 will determine which documents correspond to the newly selected category or categories. If, however, the user does not desire to change any categories assigned to the selection panels 220–250, then the process continues to step 480, where it is determined if the user desires to quit the current application. If so, the process ends, and, if not, the process reverts back to step 440 to wait for additional input by the user.

Figure 5:
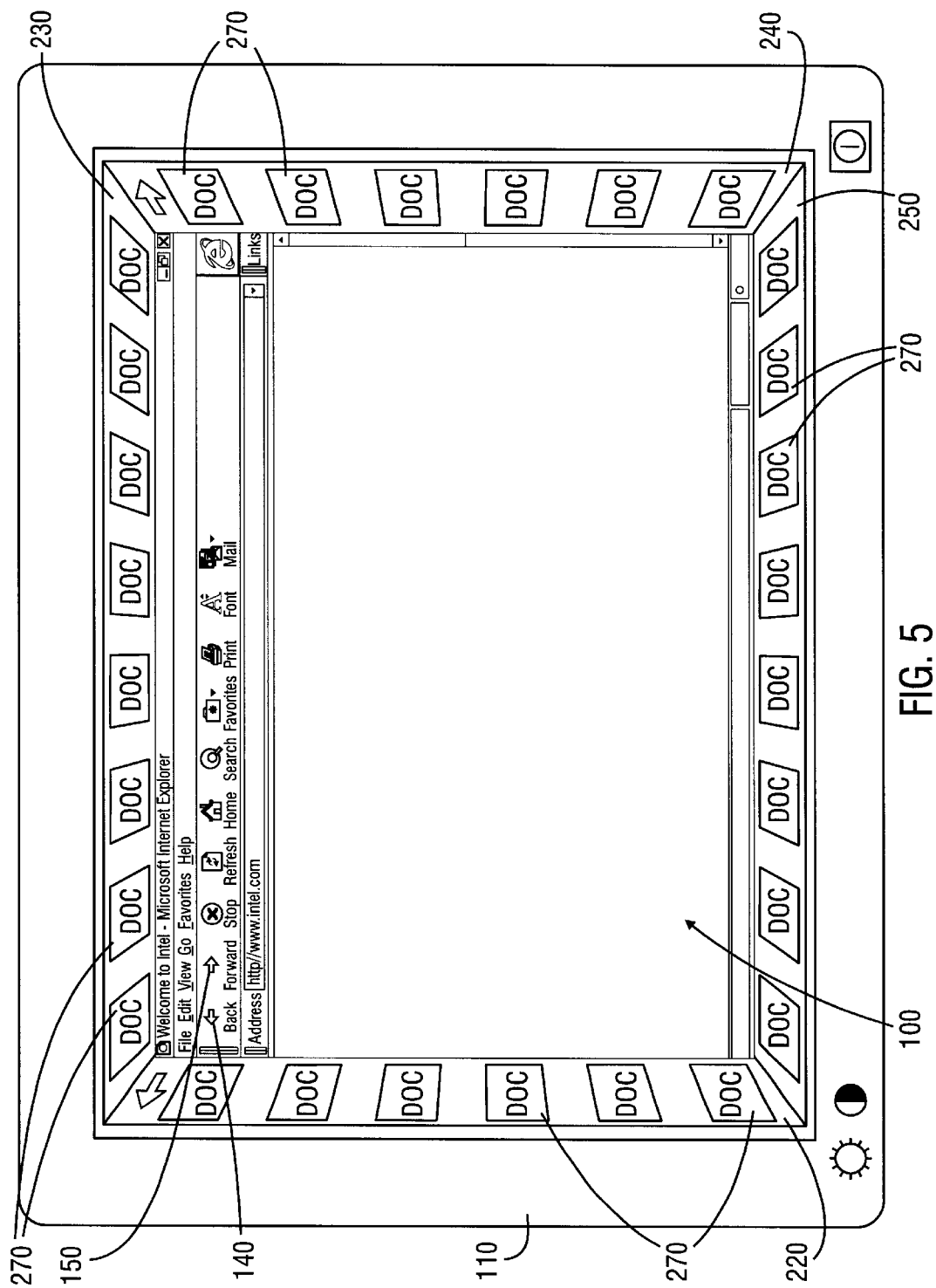
FIG. 5 shows the graphical user interface of FIG. 2 used in conjunction with the prior art web browser of FIG. 1.

Turning now to FIG. 5, the GUI 200 is shown as being used in conjunction with the aforementioned prior art web browser 100 of FIG. 1. As depicted in FIG. 5, the web browser 100 encompasses the entire area defined by the display panel 260 of the GUI 200. The thumbnails 270 appearing on each of the selection panels 220–250 of the GUI 200 could be representative of alternative web pages for selection by the user (i.e., the thumbnail 270 is a miniaturized picture of the actual web page that it represents). Each thumbnail 270 is essentially a "link" to an alternative web page, and, when selected by the user, causes the web browser 100 to display the selected web page on the web browser's display section 130.

Each of the selection panels 220–250 can have thumbnails 270 that represent a particular relationship to the currently accessed web page that appears on the display panel 260. For example, the selection panel 220 could contain thumbnails 270 that correspond to web pages that appear further back in the web broswer's URL stack; whereas the selection panel 240 could contain thumbnails 270 that correspond to web pages that appear further forward in the URL stack. Of course, as the user accesses one of these thumbnails 270 from either the "BACK" panel 220 or the "FORWARD" panel 240, the user's position in the URL stack changes. That is, some of those web pages that were "back" in the URL stack may now be "forward" on the stack (or vice versa). Accordingly, the thumbnails 270 may dynamically switch from the "BACK" panel 220 to the "FORWARD" panel 240 (or vice versa) to reflect the user's current positioning within the stack of URLs.

By displaying the thumbnails 270, the user is conveniently provided with a means to visualize the URL stack and to go directly to the desired web page (by selection of its corresponding thumbnail 270) without "blindly" stepping through a plurality of URLs to access such web page. In addition to the thumbnails 270 being grouped (or categorized) to provide a "BACK" and "FORWARD" option as described above, the thumbnails 270 could also be grouped to provide other relationships. Categories of alternative thumbnail 270 groupings could be, but not necessarily limited to:

| | |
|---|---|
| CHILDREN | documents whose address is contained as a link on the current document. |
| PARENTS | documents who have links to the current document. |
| CO-FAVORITES | documents that have been grouped with the current page in a "favorites" folder. |
| SIBLINGS | documents contained in the same directory as the current document. |
| PEERS | documents contained on the same server as the current document. |
| RELATED | documents related to the current document by automatic content analysis. |
| GLOBAL-FAVORITES | most visited documents by the user. |
| MOST RECENT DOCS | documents most recently accessed by the user. |

The user would be able to select and allocate a grouping or category of thumbnails 270 to a particular selection panel 220–250 in the same manner as previously described. Additionally, to remind the user of the relationship that a particular grouping of thumbnails 270 has to the current web page, labels (e.g., "BACK", "FORWARD", left or right arrows, etc.) can be displayed on the selection panels 220–250 to visually indicate such relationships to the user.

While the present invention has been discussed primarily in connection with the prior art web browser 100 of FIG. 1, it will be appreciated that alternative types of computer applications, such as, for example, word processors, spreadsheets, database management applications, file managers, e-mail, etc., could also be used in conjunction with the GUI 200 without departing from the spirit and scope of the invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
   displaying a current document in a center portion of a display panel of a graphical user interface;
   determining if other documents are relevant to the current document based on one or more predetermined criteria having a relationship to the current document;
   displaying a graphical thumbnail representation of one or more documents having a first relationship to the current document in a first panel of a plurality of selection panels of the graphical user interface;
   displaying a graphical thumbnail representation of one or more documents having a second relationship, different from the first relationship, to the current document in a second panel of the plurality of selection panels;
   displaying a graphical thumbnail representation of one or more documents having a third relationship, different from the first and second relationships, to the current document in a third panel of the plurality of selection panels;
   displaying a graphical thumbnail representation of one or more documents having a fourth relationship, different from the first, second and third relationships, to the current document in a fourth panel of the plurality of selection panels; and
   the graphical thumbnail representations being displayed in corresponding panels located as a border about the current document on the graphical user interface and in which the graphical thumbnail representations are minuscule pictures of actual documents that the graphical thumbnail representations represent.

2. The method of claim 1, wherein the displaying the graphical thumbnail representations comprise displaying the graphical thumbnail representations contemporaneously with the current document.

3. The method of claim 1, further comprising enabling a user to select the relationships to the corresponding panels.

4. The method of claim 1, comprising enabling a user to define the one or more predetermined criteria.

5. The method of claim 1, wherein the determining comprises determining if at least one other document of a same computer application is relevant to the current document.

6. The method of claim 1, wherein the determining comprises determining if at least one other document of a different computer application is relevant to the current document.

7. The method of claim 1, wherein the current document is associated with a web browser, an electronic mail application, a word processor, a spreadsheet application, a database application, or a file manager.

8. The method of claim 1, comprising displaying the graphical user interface to appear as a portion of a three-dimensional cuboid.

9. The method of claim 1, wherein the determining comprises determining if at least one other document is relevant to the current document using an automatic content analysis procedure.

10. The method of claim 1, comprising enabling a user to assign a category to the selection panels, wherein the first relationship corresponds to the assigned category for the first selection panel, the second relationship corresponds to the assigned category for the second selection panel, the third relationship corresponds to the assigned category for the third selection panel, and the fourth relationship corresponds to the assigned category for the fourth selection panel.

11. The method of claim 1, comprising magnifying a graphical thumbnail representation selected by a user.

12. The method of claim 1 comprising enabling a user to define one or more preferences for the graphical user interface.

13. An apparatus comprising:
   a display; and
   a processor coupled to display on the display a graphical user interface having a display panel and a plurality of selection panels, to display a current document in a center portion of the display panel, to determine if other documents are relevant to the current document based on one or more predetermined criteria having a relationship to the current document, to display a graphical thumbnail representation of one or more documents having a first relationship to the current document in a first panel of the plurality of selection panels, to display a graphical thumbnail representation of one or more documents having a second relationship, different from the first relationship, to the current document in a second panel of the plurality of selection panels, to display a graphical thumbnail representation of one or more documents having a third relationship, different from the first and second relationships, to the current document in a third panel of the plurality of selection panels, to display a graphic thumbnail representation of one or more documents having a fourth relationship, different from the first, second and third relationships, to the current document in a fourth panel of the plurality of selection panels, the graphical thumbnail representations being displayed in corresponding panels which are to be located as a border about the current document and the graphical thumbnail representations are to be minuscule pictures of actual documents that the graphical thumbnail representations represent.

14. The apparatus of claim 13, wherein the processor to display the graphical thumbnail representations contemporaneously with the current document.

15. The apparatus of claim 13, further comprising an input device, wherein the processor to enable a user to select a displayed graphical thumbnail representation with the input device and to display in the display panel the document corresponding to the selected graphical thumbnail representation.

16. The apparatus of claim 15, wherein the input device comprises a mouse, trackball, touchpad, keyboard, or touchscreen.

17. The apparatus of claim 13, further comprising an input device, wherein the processor to enable a user to define the one or more predetermined criteria with the input device.

18. The apparatus of claim 13, wherein the processor to determine if at least one other document of a same computer application is relevant to the current document.

19. The apparatus of claim 13, wherein the processor to determine if at least one other document of a different computer application is relevant to the current document.

20. The apparatus of claim 13, wherein the current document is associated with a web browser, an electronic mail application, a word processor, a spreadsheet application, a database application, or a file manager.

21. The apparatus of claim 13, wherein the processor to display the graphical user interface to appear as a portion of a three-dimensional cuboid.

22. The apparatus of claim 13, wherein the processor to determine if at least one other document is relevant to the current document using an automatic content analysis procedure.

23. The apparatus of claim 13, further comprising an input device, wherein the processor to enable a user to assign a category to the selection panels with the input device and wherein the first relationship corresponds to the assigned category for the first selection panel, the second relationship corresponds to the assigned category for the second selection panel, the third relationship corresponds to the assigned category for the third selection panel and the fourth relationship corresponds to the assigned category for the fourth selection panel.

24. The apparatus of claim 13, further comprising an input device, wherein the processor to magnify a graphical thumbnail representation selected by a user with the input device.

25. The apparatus of claim 13, further comprising an input device, wherein the processor to enable a user to define one or more preferences for the graphical user interface with the input device.

26. The apparatus of claim 13, further comprising a document source, wherein the processor to query the document source to obtain one or more documents relevant to the current document.

27. The apparatus of claim 26, wherein the document source comprises a disk, a hard disk, a modem, or an Internet connection.

28. A program storage device programmed with instructions that, if executed by a machine, perform a method comprising:

displaying a current document in a center portion of a display panel of a graphical user interface;

determining if other documents are relevant to the current document based on one or more predetermined criteria having a relationship to the current document;

displaying a graphical thumbnail representation of one or more documents having a first relationship to the current document in a first panel of a plurality of selection panels of the graphical user interface;

displaying a graphical thumbnail representation of one or more documents having a second relationship, different from the first relationship, to the current document in a second panel of the plurality of selection panels;

displaying a graphical thumbnail representation of one or more documents having a third relationship, different from the first and second relationships, to the current document in a third panel of the plurality of selection panels;

displaying a graphical thumbnail representation of one or more documents having a fourth relationship, different from the first, second and third relationships, to the current document in a fourth panel of the plurality of selection panels; and the graphical thumbnail representations being displayed in corresponding selection panels located as a border about the current document on the graphical user interface and in which the graphical thumbnail representations are minuscule pictures of actual documents that the graphical thumbnail representations represent.

29. The program storage device of claim 28, wherein the displaying the graphical thumbnail representations comprise displaying the graphical thumbnail representation contemporaneously with the current document.

30. The program storage device of claim 28, wherein the method comprises enabling a user to select the relationships to the corresponding panels.

31. The program storage device of claim 28, wherein the method comprises enabling a user to define the one or more predetermined criteria.

32. The program storage device of claim 28, wherein the determining comprises determining if at least one other document of a same computer application is relevant to the current document.

33. The program storage device of claim 28, wherein the determining comprises determining if at least one other document of a different computer application is relevant to the current document.

34. The program storage device of claim 28, wherein the current document is associated with a web browser, an electronic mail application, a word processor, a spreadsheet application, a database application, or a file manager.

35. The program storage device of claim 28, wherein the method comprises displaying the graphical user interface to appear as a portion of a three-dimensional cuboid.

36. The program storage device of claim 28, wherein the determining comprises determining if at least one other document is relevant to the current document using an automatic content analysis procedure.

37. The program storage device of claim 28, wherein the method comprises enabling a user to assign a category to the selection panels in which the first relationship corresponds to the assigned category for the first selection panel, the second relationship corresponds to the assigned category for the second selection panel, the third relationship corresponds to the assigned category for the third selection panel, and the fourth relationship corresponds to the assigned category for the fourth selection panel.

38. The program storage device of claim 28, wherein the method comprises magnifying a graphical thumbnail representation selected by a user.

39. The program storage device of claim 28, wherein the method comprises enabling a user to define one or more preferences for the graphical user interface.

40. The method of claim 1, comprising:

displaying a new current document in the display panel;

determining if one or more documents are relevant to the new current document based on the one or more predetermined criteria;

displaying a graphical thumbnail representation of one or more documents having the first relationship to the new current document in the first selection panel;

displaying a graphical thumbnail representation of one or more documents having the second relationship to the new current document in the second selection panel;

displaying a graphical thumbnail representation of one or more documents having the third relationship to the new current document in the third selection panel; and displaying a graphical thumbnail representation of one or more documents having the fourth relationship to the new current document in the fourth selection panel.

41. The method of claim 1, comprising displaying a first label corresponding to the first relationship at the first selection panel, a second label corresponding to the second relationship at the second selection panel, a third label corresponding to the third relationship at the third one selection panel and a fourth label corresponding to the fourth relationship at the fourth selection panel.

42. The apparatus of claim 13, wherein the processor to display a new current document in the display panel, to determine if one or more documents are relevant to the new current document based on the one or more predetermined criteria, to display a graphical thumbnail representation of one or more documents having the first relationship to the new current document in the first selection panel, to display a graphical thumbnail representation of one or more documents having the second relationship to the new current document in the second selection panel, to display a graphical thumbnail representation of one or more documents having the third relationship to the new current document in the third selection panel and to display a graphical thumbnail representation of one or more documents having the fourth relationship to the new current document in the fourth selection panel.

43. The apparatus of claim 13, wherein the processor to display a first label corresponding to the first relationship at the first selection panel, a second label corresponding to the second relationship at the second selection panel, a third label corresponding to the third relationship at the third selection panel and a fourth label corresponding to the fourth relationship at the fourth selection panel.

44. The program storage device of claim 28, wherein the method comprises:

displaying a new current document in the display panel;

determining if one or more documents are relevant to the new current document based on the one or more predetermined criteria;

displaying a graphical thumbnail representation of one or more documents having the first relationship to the new current document in the first selection panel;

displaying a graphical thumbnail representation of one or more documents having the second relationship to the new current document in the second selection panel;

displaying a graphical thumbnail representation of one or more documents having the third relationship to the new current document in the third selection panel; and displaying a graphical thumbnail representation of one or more documents having the fourth relationship to the new current document in the fourth selection panel.

45. The program storage device of claim 28, wherein the method comprises displaying a first label corresponding to the first relationship at the first selection panel, a second label corresponding to the second relationship at the second selection panel, a third label corresponding to the third relationship at the third selection panel and a fourth label corresponding to the fourth relationship at the fourth selection panel.

46. A method comprising:

displaying a current document in a center portion of a display panel of a graphical user interface;

determining if documents are relevant to the current document based on one or more predetermined criteria having a relationship to the current document;

displaying a graphical thumbnail representation of one or more documents having a first relationship to the current document in a first panel of a plurality of selection panels of the graphical user interface contemporaneously with the displayed current document along a top border of the current document;

displaying a graphical thumbnail representation of one or more documents having a second relationship, different from the first relationship, to the current document in a second panel of the plurality of selection panels contemporaneously with the displayed current document along a right-side border of the current document;

displaying a graphical thumbnail representation of one or more documents having a third relationship, different from the first and second relationship, to the current document in a third panel of the plurality of selection panels contemporaneously with the displayed current document along a bottom border of the current document;

displaying a graphical thumbnail representation of one or more documents having a fourth relationship, different from the first, second and third relationships, to the current document in a fourth panel of the plurality of selection panels contemporaneously with the displayed current document along a left-side border of the current document; and wherein the graphical thumbnail representations are minuscule pictures of actual documents that the graphical thumbnail representations represent.

47. The method of claim 46, comprising enabling a user to define the one or more predetermined criteria.

48. The method of claim 46, comprising enabling a user to assign a category to each selection panels, wherein the first relationship corresponds to the assigned category for the first selection panel, the second relationship corresponds to the assigned category for the second selection panel, and the third relationship corresponds to the assigned category for the third selection panel, and the fourth relationship corresponds to the assigned category for the fourth selection panel.

* * * * *